United States Patent [19]

Seragnoli

[11] Patent Number: 4,507,908
[45] Date of Patent: Apr. 2, 1985

[54] APPARATUS FOR FEEDING AND WRAPPING PRODUCTS

[75] Inventor: Enzo Seragnoli, Bologna, Italy

[73] Assignee: G. D. Societa per Azione, Bologna, Italy

[21] Appl. No.: 347,635

[22] Filed: Feb. 10, 1982

[30] Foreign Application Priority Data

Feb. 25, 1981 [IT] Italy ................................ 3345 A/81

[51] Int. Cl.³ ............................................. B65B 35/00
[52] U.S. Cl. ........................................ 53/498; 53/500; 198/460; 198/572; 493/18; 493/29
[58] Field of Search .................. 198/460, 572; 53/494, 53/500, 498, 493, 57; 493/29, 18

[56] References Cited

U.S. PATENT DOCUMENTS

| | | | |
|---|---|---|---|
| 4,029,198 | 6/1977 | Lingl, Jr. ................. | 198/460 X |
| 4,135,346 | 1/1979 | Rebsamen ................ | 53/494 |
| 4,190,146 | 2/1980 | Knuchel ................ | 198/460 |
| 4,197,935 | 4/1980 | Aterianus et al. ........ | 198/460 |
| 4,355,712 | 10/1982 | Bruno ................... | 198/460 |
| 4,394,896 | 7/1983 | McComas et al. ........ | 53/494 X |

FOREIGN PATENT DOCUMENTS

| | | | |
|---|---|---|---|
| 2346407 | 3/1974 | Fed. Rep. of Germany ...... | 198/460 |
| 1268573 | 3/1972 | United Kingdom . | |
| 1535836 | 12/1978 | United Kingdom . | |

Primary Examiner—James F. Coan
Attorney, Agent, or Firm—Fitzpatrick, Cella, Harper & Scinto

[57] ABSTRACT

An apparatus for feeding and wrapping products comprising a wrapping machine, which machine has a driving element, and a device for feeding products to the wrapping machine. The feeding device includes a first conveyor for receiving products from a dispensing apparatus, which conveyor continuously moves at either a high or a low speed, and a second conveyor which connects the first conveyor to the wrapping machine and which continuously moves at one speed in the same direction as the first conveyor. A stop element is located at the end of the second conveyor adjacent the wrapping machine. There are provided first and second controls positioned along the second conveyor at selected spacings from the wrapping machine, with each control sensing the presence or absence of products on the second conveyor. A first drive is connected to the first conveyor and is adapted to operate the first conveyor at either the high or the low speed. A switch is connected to the first control and the driving element for the wrapping machine to deactivate the driving element for the wrapping machine when the first control senses the absence of products on the second conveyor. A second drive is connected to the second control and is adapted to operate the first drive in response to the sensed absence or presence by the second control of products on the second conveyor, wherein the second drive activates the first drive at the high speed if there is an absence of products at the second control, and the second drive activates the first drive at the low speed if there is a presence of products at the second control.

5 Claims, 2 Drawing Figures

U.S. Patent   Apr. 2, 1985   4,507,908
Fig.1
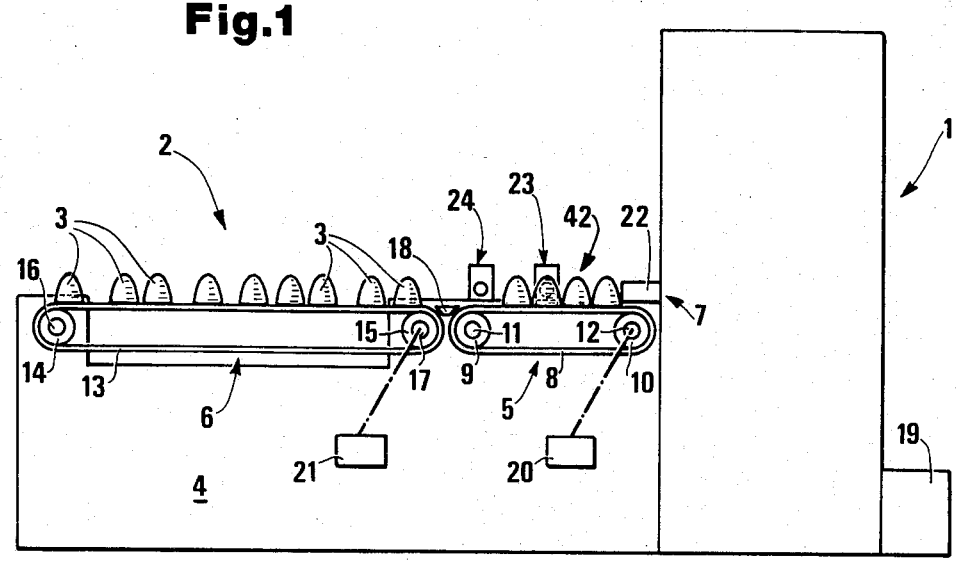
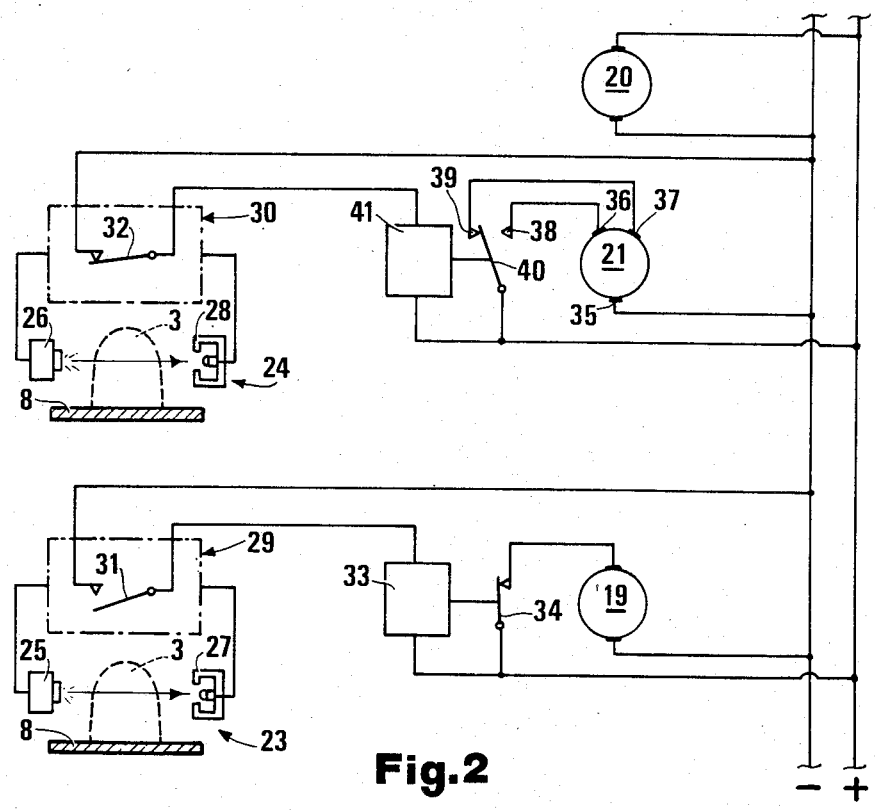
Fig.2

APPARATUS FOR FEEDING AND WRAPPING PRODUCTS

BACKGROUND OF THE INVENTION

1. Field of the Invention

This invention relates to an apparatus for feeding and wrapping products and, in particular, to an apparatus capable of receiving, transferring and wrapping articles of delicate nature, such as confectionary products, from a packaging machine.

2. Description of the Prior Art

As is well known, confectionary products, such as chocolates, tablets of chocolate and the like, are often delivered by a packaging machine in a disorganized manner or, in any event, at different rate than the rate at which the products can be accommodated by a wrapping machine.

This gives rise to problems of synchronization between two machines. Attempts have been made to solve such problems. A horizontal belt conveyor has been used to forward products to the inlet of the wrapping machine where a fixed or movable stop element causes the products to pile up in columns. From there, a device is used to transfer the products one at a time and at a suitable rate to the wrapping machine.

Such a system has various drawbacks. The most serious drawback results from the fact the products, by piling up in a large number against the stop element, transmit pressure on one another as each product is added to a column. This pressure, which is greatest on the products adjacent the stop element, may damage the products to the extent of requiring the elimination thereof. Moreover, the friction caused by the movable belt rubbing the base of the products stacked against the stop element, results in heating and wearing out of the product and, particularly, where the products are chocolate, causes soiling of the belt.

In British Patent No. 1,268,573, which is owned by the assignee of this invention, an apparatus is disclosed which eliminates some of the above disadvantages. In such an apparatus, the products are conveyed to a stop element, similar to that mentioned above, by two belt conveyors arranged in series. The belt conveyor which is closest to the stop element, is faster than the other belt conveyor and has two optical sensors for detecting the presence of products at an intermediate zone and at the rearward end, respectively, of that belt conveyor.

The sensors, which dictate modifications of the speed of the wrapping machine between two different speeds as the length of the column of products stacked against the stop element varies, are capable of maintaining the column length within two predetermined values. However, such an apparatus has certain disadvantages. Namely, the frequent accelerations and decelerations of the wrapping machine cause higher stress and wear of mechanical members of the machine, particularly cams, shafts and parts subjected to sliding friction.

Further, the frequent accelerations and decelerations involve a larger consumption of electric energy, namely, at every deceleration of the wrapping machine some amount of the kinetic energy of the machine is dissipated, while during acceleration current absorption is much greater than the operating current.

SUMMARY OF THE INVENTION

It is the object of the present invention to provide an apparatus, wherein all of the above disadvantages are minimized or overcome.

These and other objects of the present invention are met by an apparatus for feeding and wrapping products comprising a wrapping machine, which machine has means for driving same, and a device for feeding products to the wrapping machine. The feeding device includes first belt conveyor for receiving products from a dispensing apparatus which conveyor continuously moves at either a high or a low speed, and a second belt conveyor connecting said first conveyor to said wrapping machine. The second conveyor continuously moves at one speed in the same direction as said first conveyor. A stop element is located at the end of said second conveyor adjacent the wrapping machine. First and second control means are selectively positioned along the second conveyor at increased spacings, respectively, from the wrapping machine. Each control means senses the presence or absence of products on the second conveyor. First drive means is connected to said first conveyor and is adapted to operate the first conveyor at either the high or low speed. Switch means is connected to the first control means and the means for driving the wrapping machine to deactivate the means for driving the wrapping machine when the first control means senses the absence of products on said second conveyor. Second drive means is connected to the second control means and is adapted to operate the first drive means in response to the sensed absence or presence of products on the second conveyor by the second control means, wherein said second drive means activates said first drive means to operate said first conveyor at the high speed if there is an absence of products at the second control means and activates said first drive means to operate said first conveyor at the low speed if there is a presence of products at the second control means.

These and other objects and advantages of the present invention will become apparent from the following description of a preferred embodiment of the apparatus, which description is merely intended as an illustrative example and not as a limitation of the present invention.

BRIEF DESCRIPTION OF THE DRAWINGS

FIG. 1 is a schematic side view showing the apparatus of this invention; and,

FIG. 2 is an electric diagram showing the operation of the apparatus.

DESCRIPTION OF THE PREFERRED EMBODIMENTS

Referring to the drawings and, in particular, FIG. 1, an apparatus comprising a wrapping machine, generally represented by reference numeral 1, which machine is driven via conventionally known means, and device 2 for feeding products 3 to said wrapping machine 1 is shown. Device 2 has base or bed 4 supporting two horizontal belt conveyors 5, 6 which conveyors are arranged in series.

Conveyor 5, which ends at inlet position 7 of machine 1, comprises looped belt 8 located on two rollers 9 and 10, shown as left and right rollers, respectively, in FIG. 1. Rollers 9, 10 are carried by axes 11, 12, respectively, which axes are horizontal and parallel to each other.

Conveyor 6 comprises ring-coiled belt 13 located on two rollers 14, 15. Rollers 14, 15 are supported by axes 16, 17, respectively, which axes are parallel to axes 11, 12.

Bridge 18, which is placed on base 4, is between conveyors 5 and 6 to assure the continuous, unbroken movement of belts 8 and 13.

In a manner not shown, wrapping machine 1 is actuated by an electric motor 19.

Axes 12 and 17 are rotated by current from electric motors 20 and 21, respectively. Motor 21 is provided with two operating speeds. Over the right end of belt 8 of conveyor 5 at inlet position 7, base 4 supports stop element 22. Stop element 22 is located along the path of products 3 which are conveyed to machine 1. Two control devices or optical means 23, 24 are provided above conveyor 5 with one device located substantially intermediate the conveyor and the other device at the left end of the conveyor.

Referring to FIG. 2, devices 23, 24 have photoemitter elements 25, 26, respectively, which approach from a side of conveyor 5 and each element projects a light ray in the direction transverse the path of products 3. Devices 23, 24 also have photoresponsive elements or photocells 27, 28 respectively, located adjacent the other side of conveyor 5 and facing elements 25, 26, respectively.

Control devices 23, 24 have known types of amplifier-actuator circuits shown as 29, 30; respectively. Circuits 29, 30 have outlet switches 31, 32, respectively. Switches 31, 32 are closed when their respective photocells 27, 28 are illuminated, and are open when products 3 shut off the light rays emitted by their respective elements 25, 26. The closing of switch 31 is accompanied by the closing of timer device 33. Device 33, after a suitable period of time, causes the opening of a normally closed switch 34 which switch is located on the supply electric circuit for motor 19.

Motor 21, which as previously stated is operable at two different speeds, has terminal 35 common to the two speed levels, and is directly connected to a pole of an electric supply line. Terminals 36, 37 supply electricity at a low and a high speed, respectively, to motor 21. The low speed of motor 21 results in belt 13 of conveyor 6 being driven at a slower speed than that of belt 8 of conveyor 5; while, the high speed of motor 21 results in belt 13 being driven at a faster speed than that of belt 8. The terminals end at respective fixed contacts 38, 39. Contacts 38, 39, in turn, are connected by change-over switch or drive means 40 to the other pole of the electric supply line.

Change-over switch 40 is connected to timer device 41. Time device 41 is activated by the closing of switch 32 whenever photocell 28 is illuminated by the light ray emitted by element 26. Timer 41 is, preferably, selected to be a "delayed at opening and closing" type timer, which is capable of both producing or ceasing an effect after a predetermined delay upon occurrence of an event or an opposite event, respectively. In the present case, it activates after some delay change-over switch 40 from contact 39 to contact 38, and vice versa, respectively at the opening and closing of switch 32 under the action of photocell 28. This action results in a change of speeds of belt 13 of conveyor 5.

As shown in FIG. 2, motor 20 is directly connected to the electric supply line. Motor 20, which causes rotation of axes 12 of belt 8, drives belt 8 of conveyor 5 at a constant speed, which speed is proportionate to the speed of machine 1.

In operation, if products 3 ae regularly fed to conveyor 6 at a flow rate consistent with the operation speed of wrapping machine 1, a short column 42 of products 3 is constantly present on conveyor 5 wih one end stacked against stop 22. The other end of column 42 is located between control devices 23 and 24.

Conventional drawing means, not shown, sequentially forward products 3 to the wrapping line of machine 1; while, more products 3 are continuously added to column 42. Thus, the length of the column remains substantially unaltered.

Under such conditions, photocell 27 is obscured or covered by products 3. Switch 31, which is in open condition, holds inoperative timer 33 and closed switch 34 allowing a regular supply of electricity to motor 19.

If photocell 28 is struck by the light ray emitted from element 26, it holds switch 32 in closed position, so that change-over switch 40 driven by timer 41 remains connected to contact 39 of terminal 37, to which the high speed of motor 21 corresponds. Under such a condition, conveyor 6 moves forward at a speed higher than the speed of conveyor 5.

Should there occur a decrease in the number of products 3 delivered to wrapping machine 1 or an increase in the number of products 3 delivered to conveyor 5 with everything else remaining constant, the length of column 42 on conveyor 5 will increase. If the increase is beyond control device 24, the light ray emitted from element 26 will be shielded by products 3 and photocell 28 will be obscured or covered. This will immediately be followed by the opening of switch 32 and deactivation of timer 41.

Timer 41, which as stated above is delayed at closing and opening, does not immediately cause a flip of change-over switch 40 from contact 39 to the contact 38. Therefore, should the length of column 42 return to its normal condition before the predetermined time for the triggering of change-over switch 40 has elapsed, timer 41 will not cause a flip of switch 40.

Conversely, if the delay time does elapse, change-over switch 40 will flip to connect terminal 36 to the electric supply line. Motor 21 will then start to drive belt 8 of conveyor 5 at the low speed, which speed is lower than the speed of conveyor 6.

In the case where the packaging machine delivers products 3 to feeder device 2 through a conveyor-aligner, not shown, which is the case is in British Patent No. 1,535,836, the motor for the feeder device can be selected as one having two operating speeds. The motor can be connected to change-over switch 40 in the same manner as discussed above for motor 21. This will permit a higher number of products 3 to be examined while also permitting the machine to rebalance excesses of feeding when the excesses are of reasonable amount or for a reasonable duration.

Following the described adjustment, the products 3 already present on conveyor 6 and conveyor-aligner, if any, are transferred to conveyor 5, at a fast rate thereby quickly shortening the length of column 42. Thus, column 42 will again be of such length as to allow the light ray emitted from element 26 to reach photocell 28. After a delay from the moment of this occurrence, timer 41 will cause change-over switch 40 to flip from contact 38 to contact 39, and thus, motor 21 again will operate at its high speed.

When column 42 of products 3 is shortened, probably due to a decrease in the output of the dispensing machine, exposing photocell 27 to the light emitted from element 25, switch 31 closes activating timer 33.

Should the calibrated delay time for timer 33 elapse without column 42 re-extending so as to obscure photocell 27, contact 34 will open and motor 19 will stop. When fresh products 3 arrive in front of photocell 27, motor 19 will restart.

Although certain embodiments have been described and illustrated, modification may be made herein, as by adding, combining or subdividing parts or by substituting equivalents or by applying the invention to other wrapping and feeding devices while retaining advantages and benefits of this invention.

What is claimed is:

1. In an apparatus for feeding and wrapping products comprising a wrapping machine having means for operating said wrapping machine and a device for feeding products to said wrapping machine which device includes a first belt conveyor for receiving products from a dispensary apparatus, a second belt conveyor connecting said first conveyor to said wrapping machine, a stop element located on and at the end of said second conveyor adjacent said wrapping machine, and first and second control means selectively positioned along said second conveyor at increased spacing, respectively, from said wrapping machine, said first and second control means each having sensing means for sensing the absence or presence of products on said second conveyor, the improvement which comprises:

first drive means for driving said first conveyor at either a high speed or a low speed;

second drive means for driving said second conveyor at a continuous speed in the same direction as said first conveyor;

switch means connected between said first control means and said operating means for said wrapping machine to deactivate said operating means when said first control means senses the absence of products on said second conveyor; and control circuitry connected between said second control means and said first drive means for controlling the driving speed of said first drive means in response to the output from said second control means, wherein said control circuitry causes said first drive means to operate at high speed when said second control means senses the absence of products on said second conveyor and causes said first drive means to operate at low speed when said second control means senses the presence of products on said second conveyor.

2. The apparatus according to claim 1, wherein the speed of said second conveyor is intermediate the high and the low speeds for said first conveyor.

3. The apparatus according to claim 1 wherein said switch means is connected to said first control means through a first delay timer circuit, and wherein said operating means for said wrapping machine is also connected to said second control means through a second delay timer circuit.

4. The apparatus according to claim 3, wherein the second delay timer circuit is a delayed closing and opening type delay timer circuit.

5. The apparatus according to claim 1, wherein said control circuitry includes a delay timer circuit and a speed controlling change-over switch.

* * * * *